Figure 1:
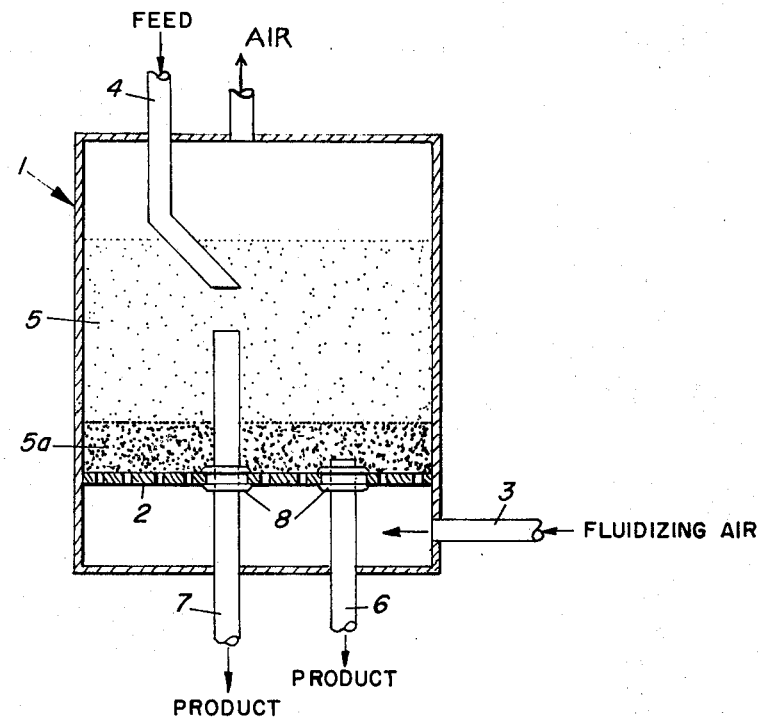

United States Patent [19]

Weintraub et al.

[11] 3,774,759
[45] Nov. 27, 1973

[54] SEPARATION OF PARTICULATE SOLIDS OF VARYING DENSITIES IN A FLUIDIZED BED
[75] Inventors: Murray Weintraub; Albert W. Deurbrouck, both of Pittsburgh, Pa.
[73] Assignee: The United States of America, as represented by the Secretary of the Interior
[22] Filed: Dec. 16, 1970
[21] Appl. No.: 98,509

[52] U.S. Cl. .............................................. 209/474
[51] Int. Cl. .............................................. B03b 3/04
[58] Field of Search ..................... 209/474, 11, 502, 209/488, 486, 494, 172.5, 466, 468

[56] References Cited
UNITED STATES PATENTS
1,291,137  1/1919  Reed ................................... 209/474
3,349,912  10/1967  Eveson et al. ..................... 209/474
2,303,367  12/1942  Kendall et al. ................... 209/466 X FOREIGN PATENTS OR APPLICATIONS
1,058,078  3/1954  France ............................. 209/474

OTHER PUBLICATIONS
Fourth International Coal Preparation Congress, 1962, pp. 405–407.

Primary Examiner—Frank W. Lutter
Assistant Examiner—William Cuchlinski, Jr.
Attorney—Ernest S. Cohen and M. Howard Silverstein

[57] ABSTRACT

A particulate feedstock is separated into a light fraction and a heavy fraction by feeding it into a fluidized bed of particulate material whose particle size and specific gravity, relative to the particle sizes and specific gravities of said light and heavy fractions, are such that one of these fractions readily stratifies into an easily removable layer in the bed while the other fraction tends to remain intermixed with the bed material rather than stratifying. Said other fraction is removed as product from the bed while it is in said intermixed condition.

2 Claims, 2 Drawing Figures

PATENTED NOV 27 1973

3,774,759

INVENTORS
MURRAY WEINTRAUB
ALBERT W. DEURBROUCK

BY Ernest S. Cohen
M. Howard Silverstein
ATTORNEYS

SEPARATION OF PARTICULATE SOLIDS OF VARYING DENSITIES IN A FLUIDIZED BED

This invention relates to the separation of particulate solids of varying densities from one another.

The separation of particulate solids from one another by stratification of the heavy and light fractions in a fluidized bed is a well known technique. To enhance control of the separation, it is also well known to employ certain additional particulate materials such as fine sand or magnetite as the fluidized bed material. In such an operation, the sand or magnetite is maintained in a fluidized state after which a particulate feedstock such as as-mined crushed coal is injected. Impurities in the coal then "sink" to the bottom while the lighter purified coal particles "float" to the top. This latter technique is a particulately effective separation technique, except that as the feedstock decreases in size, it has heretofore been observed that it tends to mix with the bed material rather than readily stratifying into a plurality of layers. Thus, with feedstocks composed of relatively small particles, separation by stratification is impractical, time-wise, and is sometimes apparently impossible to achieve. Further, the lower air velocities required for stratification separation with such smaller particles often times cannot be successfully maintained because of the presence of larger particles in the feedstock which tend to inhibit smooth fluidization at low gas velocities. As a result, heretofore fluidized bed separations have not been employed to separate particulate solids into two fractions wherein the feedstock particles are so small that the feedstock tends to intermix with the bed material rather than readily separating into a plurality of layers. This is particularly manifested in the stratification separation of impurities from coal particles having a diameter of less than one-fourth inch.

We have now developed a fluidized bed separation system for a feedstock having relatively small particles which do not readily stratify into a plurality of layers within the bed material. In arriving at our discovery, it was first observed that with a relatively fine feedstock of, for example, impure coal, although the lighter (purified coal) particles tended to remain intermixed with the magnetite bed material, the heavier (impurity) fraction would readily stratify to the bottom of the bed. This observation is congruous with the discussion on the intermixing phenomena presented in the Fourth International Coal Preparation Congress, 1962, pages 405–407. Therein the researchers reported that complete intermixing of a feedstock fraction with the fluidized bed material would occur when the ratio of the feedstock particle diameter ($d_1$) to the fluidized bed material particle diameter ($d_2$) equaled the inverse proportion to power 3/2 of the ratio between the specific gravity ($\delta_1$) of the feedstock fraction and the specific gravity ($\delta_2$) of the bed material particles, i.e., $d_1/d_2 = (\delta_2/\delta_1)^{3/2}$. These same researchers also observed (page 406) that even when the feedstock particles are somewhat larger in size than the size necessary for complete mixing in accordance with this formula, there is still sufficient mixing to prevent a practical and economical stratification separation.

Accordingly, in the practice of the present invention the relative particle sizes and specific gravities of (a) the bed material and (b) the light and heavy fractions of the feedstock are such that one of the fractions readily stratifies into an easily-removable layer while the other fraction tends to remain intermixed with the bed material. Said other fraction is then removed, as product, from generally the middle of the bed while it is still intermixed with the bed material. To carry out the operation, both the feed conduit and product withdrawal conduits are adjustable with respect to different sections or portions of the fluidized bed. In particular, coal of less than one-fourth inch in diameter is readily separated from heavy impurities by the system of the present invention.

As used throughout the specification and claims, the terms "mixed" and "intermixed" mean that the feedstock fraction is essentially in a non-stratified state within the fluidized bed material.

It is therefore an object of the present invention to separate a particulate solid material into a light and heavy fraction in a fluidized bed wherein one of these fractions readily intermixes with the bed material rather than stratifying.

A further object is to separate coal from impurities in such a system.

A still further object is to provide apparatus for such a separation.

Figure 2:
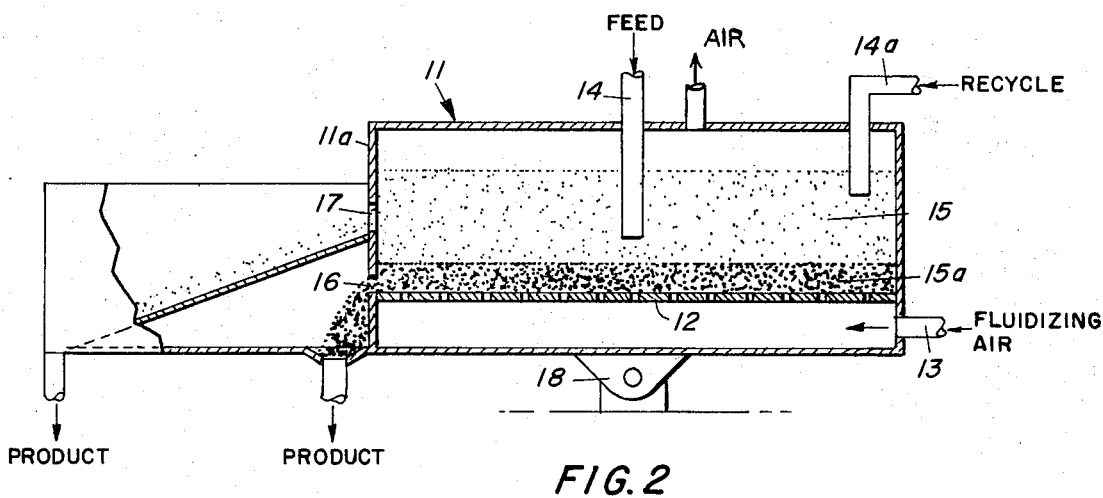

Other objects and advantages will be obvious from the following more detailed description of the invention in conjunction with drawings in which:

FIG. 1 is a schematic side view of an apparatus suitable for carrying out the present invention; and FIG. 2 is an alternative embodiment.

In the practice of the present invention the equipment employed to bring about fluidized bed separation of particulate solids is basically the same as that heretofore employed in this art. The essential difference is that only one means is provided for removing stratified product from the bed. The other product withdrawal means is located generally toward the middle section or portion of the bed.

Referring now to FIG. 1, reference numeral 1 designates a cylindrical separation chamber having an air distributor plate 2 which supports the fluidized bed. Conduit 3 introduces fluidizing air below plate 2. Fluidizing gas velocities are generally the same as those heretofore employed in the separation-by-stratification art. In such prior art operations, the bed material is desirably maintained in a fluidized but quiet condition with a minimum amount of ebullition. Such smooth fluidization prevents the feedstock particles from being agitated within the bed material, and thus prevents intermixing and enhances stratification thereof. In the present invention, these same fluidizing velocities are employed except that the need for substantially non-bubbling conditions is not as critical since there is no concern if one of the feedstock fractions intermixes with the bed material.

A conduit 4 conveys bed material to the chamber 1 so that a fluidized bed 5 can be established therein. Thereafter, the particulate feedstock to be separated into a light and heavy fraction is introduced into the chamber through conduit 4 together with make-up bed material, if desired, to replace bed material removed during product withdrawal. By employing a vertically and radially adjustable feed conduit, the feedstock can be admitted into the bed, at equilibrium, at a point most closely approximating the composition of the incoming feedstock, which results in a more stable and efficient operation. This is analogous to the variable feed plate selection in the operation of a distillation column.

For any particular feedstock, the respective particle sizes and specific gravities of the light and heavy fractions thereof relative to the particle size ($d$) and specific gravity ($\delta$) of the bed material are such that one of these feedstock fractions will readily mix with the bed material rather than stratifying, while the other fraction will readily stratify. If the size ($d_1$) of one of the feedstock fractions is such that it is less than 10 times the size necessary for complete intermixing with the bed material in accordance with the formula $$d_1 = d_{bed\ material}\ (\delta_{bed\ material}/\delta_1)3/2$$

then said one fraction will tend to remain substantially intermixed with the bed material. The intermixing becomes greater and the advantages of this invention more pronounced when the particle size of the to-be-intermixed fraction is less than 4 times the size necessary for complete intermixing. Stratification of the to-be-intermixed fraction will, of course, occur among some of the particles larger than the size necessary for complete intermixing, but this does not detract from the operability of the present invention.

With regard to the to-be-stratified fraction of the feedstock, in order to maximize stratification, its particle size is preferably at least 10 times its theoretical size necessary for complete intermixing in accordance with the above formula, although adequate stratification and significant separations can be achieved when it is at least 4 times said theoretical size.

As can be seen from the above formula, when both the light and heavy fractions in the feedstock are approximately the same size, the operation can be carried out so that only the light fraction intermixes with the bed material; but intermixing of only the heavy fraction cannot be attained under these conditions. However, in a feedstock wherein the heavy fraction is much finer than the light fraction, then there can be an operation wherein the light fraction stratifies while the heavy fraction intermixes. With regard to the drawings, for the sake of convenience, the intermixed fraction will be referred to as the light fraction, and the heavy fraction as the stratified layer.

Referring again to FIG. 1, a vertically adjustable conduit 6 projects into the bed, and has an opening at the bottom of the bed to remove the stratified heavy fraction of the feedstock together with some bed material as the bottom layer 5a thereof. Vertically adjustable conduit 7 projects into the central portion of the bed intermediate the top and bottom sections, and removes the intermixed light fraction.

Both conduits 6 and 7 extend through seals 8 in plate 2. Other seals (not shown) similar to seals 8 are radially disposed and plugged in plate 2 so that withdrawal conduits 6 and 7 may be adjusted radially as well as vertically, if desired. Conduits 6 and 7 convey product to separation chambers (not shown) of a design heretofore employed in the art so that bed material can be separated therefrom and recycled to chamber 1 through conduit 4. Such separation chambers may simply be screening devices or magnetic separators in situations where the bed material is, for example, magnetite while the feedstock is nonmagnetic.

Product quality is determined by residence time within vessel 1, and this is controlled by the means heretofore employed to adjust rates of flow from fluidized beds.

Referring now to the alternative embodiment shown in FIG. 2, reference numeral 11 designates a rectangular trough having an air distributor plate 12 supplied with fluidizing air through conduit 13. Bed material and, subsequently, the feedstock are admitted through laterally and vertically adjustable conduit 14 to establish fluidized bed 15.

An adjustable orifice 16 is located at the bottom of an end wall 11a of trough 11 to allow the stratified heavy fraction to be removed from the bed as the bottom layer 15a thereof. In the middle of the same end wall 11a is located another adjustable orifice 17 to allow the intermixed lighter fraction of the feed to be removed from generally the middle of the bed 15 intermediate the top and bottom sections or portions thereof. Recycled bed material can be admitted with the feedstock through conduit 14 or through a vertically adjustable recycle conduit 14a. Residence time of the feedstock can be adjusted by the positions and areas of orifices 16 and 17 in end wall 11a, by the lateral position of inlet conduit 14; or by inclination of the vessel by optional pivot means 18.

Other fluidized bed mechanisms such as splitter plates and baffles, mechanical rakes and vibrators for facilitating moving can obviously be employed in the system.

The following example illustrates the effectiveness of the process of the present invention:

EXAMPLE

An impure ground coal (30 percent impurities; coal, 1.35 sp.g.; impurities 2.6 sp.g.) having a particle size of 50 percent in the range three-eighths to one-fourth inch, 25 percent in the range 6 to 8 U.S.S. mesh and 25 percent in the range 14 to 30 U.S.S. mesh was fed into a fluidized bed of magnetite (200–300 U.S.S. mesh) being fluidized with air at 2.1 feet per minute. The coal was maintained in the bed for 5 minutes. Prior to product withdrawal, the bed consisted of 1.8 percent by weight of coal feedstock and 98.2 percent magnetite.

Purified coal then drawn off at a bed height of 60 percent contained 2.9 percent impurity, and was equal to 83.7 percent of the potentially clean coal in the feedstock. When the experiment was repeated and the coal product was drawn off at a bed height of 66 percent, 90.7 percent of the potentially clean coal in the feedstock was recovered containing 3.8 percent impurity.

Although the present invention has been described with regard to a particular fraction such as the light fraction which tends to intermix with the bed material rather than stratifying, it should be understood that there may be present in the feedstock substantial amounts of larger particles in the light fraction which readily stratify to the top layer in the fluidized bed. Under these circumstances, it may be advantageous to provide top layer removal means in conjunction with the means to remove particulate matter from the bottom and middle of the bed.

What is claimed is:

1. A process for the separation of a particulate feedstock into a light fraction and a heavy fraction consisting essentially of a. feeding said feed stock into a fluidized bed of particulate material whose particle size and specific gravity, relative to the particle sizes and specific gravities of said light and heavy fractions, are such that one of said fractions readily stratifies as a top or bottom layer adjacent said bed, and the other of said fractions readily intermixes with said bed material as a non-stratified fraction throughout said bed;

b. removing said stratified layer away from said bed;
c. removing said other fraction from within said bed while said other fraction is non-stratified and intermixed with said bed material; and wherein the relationship of the particle size ($d_1$) and specific gravity ($\delta_1$) of said other fraction to the particle size ($d_2$) and specific gravity ($\delta_2$) of said bed material is such that the particle size of said other fraction is less than four times the theoretical size of said other fraction as calculated from the formula $d_1 = d_2(\delta_2/\delta_1)^{3/2}$, and wherein the relationship of the particle size ($d_3$) and specific gravity ($\delta_3$) of said one fraction of the particle size ($d_2$) and specific gravity ($\delta_2$) of said bed material is such that the particle size of said one fraction is at least 10 times the theoretical size of said one fraction as calculated from the formula $d_3 = d_2(\delta_2/\delta_3)^{3/2}$.

2. The process of claim 1 wherein said feedstock is impure coal and said light fraction is purified coal.

* * * * *